(12) United States Patent
Mollenkopf et al.

(10) Patent No.: US 7,761,079 B2
(45) Date of Patent: Jul. 20, 2010

(54) POWER LINE COMMUNICATION DEVICE AND METHOD

(75) Inventors: James Douglas Mollenkopf, Fairfax, VA (US); David Stanley Yaney, Poolesville, MD (US)

(73) Assignee: Current Technologies, LLC, Germantown, MD (US)

( * ) Notice: Subject to any disclaimer, the term of this patent is extended or adjusted under 35 U.S.C. 154(b) by 1076 days.

(21) Appl. No.: 11/423,206

(22) Filed: Jun. 9, 2006

(65) Prior Publication Data

US 2007/0286079 A1    Dec. 13, 2007

(51) Int. Cl.
*H04M 9/00* (2006.01)
(52) U.S. Cl. .................. 455/402; 370/360; 370/398
(58) Field of Classification Search .............. 455/402; 340/310.11
See application file for complete search history.

(56) References Cited

U.S. PATENT DOCUMENTS

| | | | |
|---|---|---|---|
| 3,810,096 A | 5/1974 | Kabat et al. | |
| 3,942,170 A | 3/1976 | Whyte | |
| 3,944,723 A | 3/1976 | Fong | |
| 3,967,264 A | 6/1976 | Whyte et al. | |
| 4,012,733 A | 3/1977 | Whyte | |
| 4,057,793 A | 11/1977 | Johnson et al. | |
| 4,060,735 A | 11/1977 | Pascucci et al. | |
| 4,433,284 A | 2/1984 | Perkins | |
| 4,473,816 A | 9/1984 | Perkins | |
| 4,473,817 A | 9/1984 | Perkins | |
| 4,569,045 A | 2/1986 | Schieble et al. | |
| 4,642,607 A | 2/1987 | Strom et al. | |
| 4,675,648 A | 6/1987 | Roth et al. | |
| 4,686,382 A | 8/1987 | Shuey | |
| 6,933,835 B2 | 8/2005 | Kline | |
| 6,950,567 B2 | 9/2005 | Kline | |
| 6,958,680 B2 | 10/2005 | Kline | |
| 6,965,302 B2 | 11/2005 | Mollenkopf et al. | |

(Continued)

FOREIGN PATENT DOCUMENTS

DE    197 28 270 A1    1/1999

(Continued)

OTHER PUBLICATIONS

"International Search Report", *International Search Report* Dated Sep. 12, 2008 Application No. PCT/US07/69938.

(Continued)

*Primary Examiner*—Rafael Pérez-Gutiérrez
*Assistant Examiner*—Marcos Batista
(74) *Attorney, Agent, or Firm*—Mel Barnes; Capital Legal Group, LLC

(57) ABSTRACT

A versatile power line communication device is provided. One embodiment of the device includes a controller having memory, a first modem in communication with the controller, and a first power line interface including a second modem, wherein the second modem is in communication with the controller. The embodiment may also include a switch communicatively coupled to the controller and having an upstream port and a downstream port. The switch may be configured to communicate data from one of the upstream port to the downstream port, and vice versa, without the data being supplied to the controller. The switch may also have a data port configured to be coupled to high data rate devices such as mobile telephone cell sites.

37 Claims, 4 Drawing Sheets

U.S. PATENT DOCUMENTS

| | | | |
|---|---|---|---|
| 6,965,303 | B2 | 11/2005 | Mollenkopf |
| 6,980,090 | B2 | 12/2005 | Mollenkopf |
| 6,998,962 | B2 | 2/2006 | Cope et al. |
| 7,046,882 | B2 | 5/2006 | Kline |
| 7,075,414 | B2 | 7/2006 | Giannini et al. |
| 7,142,094 | B1 | 11/2006 | Davidow et al. |
| 7,248,158 | B2 | 7/2007 | Berkman et al. |
| 7,259,657 | B2 | 8/2007 | Mollenkopf et al. |
| 7,307,510 | B2 | 12/2007 | Berkman et al. |
| 7,382,232 | B2 | 6/2008 | Gidge et al. |
| 2001/0054953 | A1 | 12/2001 | Kline |
| 2002/0002040 | A1 | 1/2002 | Kline et al. |
| 2002/0097953 | A1 | 7/2002 | Kline |
| 2002/0109585 | A1 | 8/2002 | Sanderson |
| 2002/0110310 | A1 | 8/2002 | Kline |
| 2002/0110311 | A1 | 8/2002 | Kline |
| 2002/0118101 | A1 | 8/2002 | Kline |
| 2002/0121963 | A1 | 9/2002 | Kline |
| 2002/0154000 | A1 | 10/2002 | Kline |
| 2003/0039257 | A1 | 2/2003 | Manis |
| 2003/0169155 | A1 | 9/2003 | Mollenkopf et al. |
| 2004/0110483 | A1 | 6/2004 | Mollenkopf |
| 2004/0113756 | A1 | 6/2004 | Mollenkopf |
| 2004/0113757 | A1 | 6/2004 | White, II et al. |
| 2004/0135676 | A1 | 7/2004 | Berkman et al. |
| 2004/0213367 | A1* | 10/2004 | Han .......................... 375/354 |
| 2004/0223617 | A1 | 11/2004 | Corcoran et al. |
| 2004/0227621 | A1 | 11/2004 | Cope et al. |
| 2004/0227622 | A1 | 11/2004 | Giannini et al. |
| 2005/0046550 | A1 | 3/2005 | Crenshaw et al. |
| 2005/0111533 | A1 | 5/2005 | Berkman |
| 2005/0168326 | A1 | 8/2005 | White et al. |
| 2006/0165054 | A1 | 7/2006 | Iwamura |
| 2006/0262881 | A1 | 11/2006 | Cern |
| 2006/0291546 | A1 | 12/2006 | Zitting |
| 2006/0291575 | A1 | 12/2006 | Berkman et al. |
| 2007/0002771 | A1 | 1/2007 | Berkman et al. |
| 2007/0052532 | A1 | 3/2007 | Berkman |
| 2007/0153815 | A1* | 7/2007 | She et al. ..................... 370/401 |
| 2007/0201494 | A1 | 8/2007 | Lou et al. |
| 2007/0286079 | A1 | 12/2007 | Mollenkopf et al. |
| 2007/0287406 | A1 | 12/2007 | Kline |
| 2008/0031367 | A1 | 2/2008 | Berkman |
| 2009/0073884 | A1* | 3/2009 | Kodama et al. ............. 370/235 |

FOREIGN PATENT DOCUMENTS

| | | | |
|---|---|---|---|
| GB | 2 293 950 | A | 4/1996 |
| JP | 1276933 | | 11/1989 |
| WO | WO-01/08321 | A1 | 2/2001 |
| WO | WO-2004/008656 | A1 | 1/2004 |

OTHER PUBLICATIONS

"Written Opinion", *Written Opinion* Dated Sep. 12, 2008 Application No. PCT/US07/69938.

"IEEE Guide for Power-Line Carrier Applications, ANSI/IEEE Std 643-1980", *The Institute of Electrical and Electronics Engineers, Inc.*, (1980),1-80.

"PLC, A New Competitor in Broadband Internet Access", *Power Line Communications Conference*, (Dec. 12, 2001),1-60.

"Power Line Communications", *Power Line Communications*, www.plexeon.com/power.html, (1998),1-2.

Feduschak, N A., "Waiting in the Wings: Is Powerline Technology Ready to Compete with Cable?", www.cabletoday.com/ic2/archives/0301/0301powerline.htm, (Mar. 2001),1-5.

Horiguchi, Akira, "High Speed Power Line Communication Technology", *Mitsubishi Electric Advance* vol. 109, (Mar. 2005),1-27.

Jee, G et al., "Demonstration of the Technical Viability of PLC Systems on Medium- and Low-Voltage Lines in the United States", *IEEE Communication Magazine*, (May 2003),108-112.

* cited by examiner

POWER LINE COMMUNICATION DEVICE AND METHOD

FIELD OF THE INVENTION

The present invention generally relates to methods and apparatus for providing data services, and more particularly to devices and method for communicating data, such as high data rate broadband data, over a power line.

BACKGROUND OF THE INVENTION

Users are increasingly relying on immediate access to many types of data for their entertainment, work and communication needs. Users access cell phones to communicate over wireless communication networks. Entertainment appliances, such as televisions, receive cable signals to view television shows and movies on demand. Users access the internet to exchange e-mail communications and communicate audio, video, multimedia and textual data. Delivering these various data services requires a communications infrastructure.

One type of infrastructure being adapted to deliver broadband communication services to user premises is the power distribution system infrastructure. Power line communication systems include devices for transmitting data signals over power lines and may also utilize other communications media.

As the demand for high speed data services of all kind increases, there is a need for power line communication devices to be more versatile, more effective, and more economically efficient at delivering data services to users.

SUMMARY OF THE INVENTION

The present invention provides a versatile power line communication device. One embodiment of the device includes a controller having memory, a first modem in communication with the controller, and a first power line interface including a second modem, wherein the second modem is in communication with the controller. The embodiment may also include a switch communicatively coupled to the controller and having an upstream port and a downstream port. The switch may be configured to communicate data from one of the upstream port to the downstream port, and vice versa, without the data being supplied to the controller. The switch may also have a data port configured to be coupled to high data rate devices such as mobile telephone cell sites.

The invention will be better understood by reference to the following detailed description taken in conjunction with the accompanying drawings.

BRIEF DESCRIPTION OF THE DRAWINGS

The invention is further described in the detailed description that follows, by reference to the noted drawings by way of non-limiting illustrative embodiments of the invention, in which like reference numerals represent similar parts throughout the drawings. As should be understood, however, the invention is not limited to the precise arrangements and instrumentalities shown. In the drawings.

DETAILED DESCRIPTION OF ILLUSTRATIVE EMBODIMENTS

In the following description, for purposes of explanation and not limitation, specific details are set forth, such as particular networks, communication systems, computers, terminals, devices, components, techniques, data and network protocols, software products and systems, enterprise applications, operating systems, development interfaces, hardware, etc. in order to provide a thorough understanding of the present invention.

However, it will be apparent to one skilled in the art that the present invention may be practiced in other embodiments that depart from these specific details. Detailed descriptions of well-known networks, communication systems, computers, terminals, devices, components, techniques, data and network protocols, software products and systems, operating systems, development interfaces, and hardware are omitted so as not to obscure the description of the present invention.

Communication System

The communications network of the present invention may provide high speed broadband internet access, mobile telephone communications, broadband communications, streaming video and audio services, and other communication services to each home, building or other structure, and to each room, office, apartment, or other unit or sub-unit of a multi-unit structure. In addition, the power line wireless network may provide these communication services to mobile and stationary devices in outdoor areas such as customer premises yards, parks, stadiums, and also to public and semi-public indoor areas such as subway trains, subway stations, train stations, airports, restaurants, public and private automobiles, bodies of water (e.g., rivers, bays, inlets, etc.), building lobbies, elevators, etc.

Figure 1:
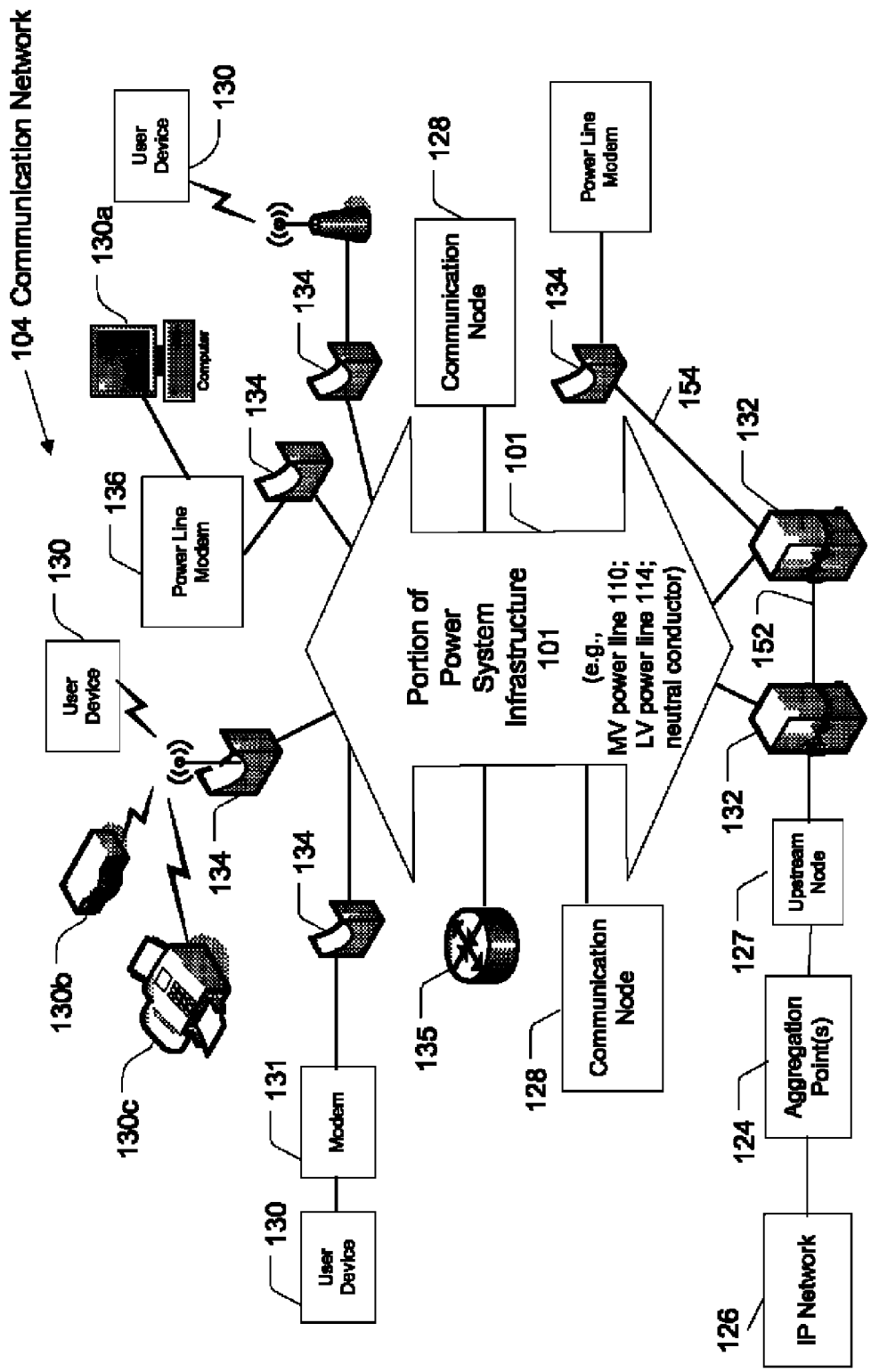
FIG. 1 is a block diagram of a example communication system relying on a variety of communications media, including power lines, wired and wireless media.

FIG. 1 shows components of a communication network 104 that may rely, in part, on portions of the power system infrastructure 101 to carry data communications. The communication network 104 includes a plurality of communication nodes 128 which form communication links using power lines and other communication media. Various user devices 130 and power line communication devices may transmit and receive data over the links to communicate via an IP network 126 (e.g., the Internet). One type of communication node 128 may be a backhaul node 132. Another type of communication node 128 may be an access node 134. Another type of communication node 128 may be a repeater node 135. A given node 128 may serve as a backhaul node 132, access node 134, and/or repeater node 135.

A communication link is formed between two communication nodes 128 over a communication medium. Some links may be formed over MV power lines 110. Some links may be formed over LV power lines 114. Other links may be gigabit-Ethernet links 152, 154 formed, for example, using a fiber optic cable. Thus, some links may be formed using a portion 101 of the power system infrastructure, while other links may be formed over another communication media, (e.g., a coaxial cable, a T-1 line, a fiber optic cable, wirelessly (e.g., IEEE 802.11 a/b/g, 802.16, 1 G, 2 G, 3 G, or satellite such as WildBlue®)). The links formed by wired or wireless media may occur at any point along a communication path between a backhaul node 132 and a user device 130.

Each communication node 128 may be formed by one or more communication devices. Communication nodes which communicate over a power line medium include a power line communication device. Exemplary power line communication devices include a backhaul device 138 (see FIG. 2), an access device 139 (see FIG. 4), and a repeater 135. Communication nodes which communicate wirelessly may include a mobile telephone cell site or a wireless access point having at least a wireless transceiver. Communication nodes which communicate over a coaxial cable may include a cable modem. Communication nodes which communicate over a twisted pair wire may include a DSL modem or other modem. A given communication node typically will communicate in two directions (either full duplex or half duplex), which may be over the same or different types of communication media. Accordingly, a communication node may include one, two or more communication devices.

A backhaul node 132 may serve as an interface between a power line portion (e.g., an MV power line 110) of the network 104 and an upstream node, which may be, for example, an aggregation point 124 that may provide a connection to an IP network 126. The communication network 104 preferably includes one or more backhaul nodes 132. Upstream communications from user premises may be communicated to an access node 134, to a backhaul node 132, and then transmitted to an aggregation point 124 which is linked to the IP network 126. The backhaul node 132 may be coupled to the aggregation point 124 directly or indirectly (i.e., via one or more intermediate nodes). The backhaul node 132 may communicate with its upstream device via any of several alternative communication media, such as a fiber optic (digital or analog (e.g., Wave Division Multiplexed), coaxial cable, WiMAX, IEEE, 802.11, twisted pair and/or another wired or wireless media. Downstream communications from the IP network 126 typically are communicated through the aggregation point 124 to the backhaul node 132. The aggregation point 124 typically includes an Internet Protocol (IP) network data packet router and is connected to an IP network backbone, thereby providing access to an IP network 126 (i.e., can be connected to or form part of a point of presence or POP). Any available mechanism may be used to link the aggregation point 124 to the POP or other device (e.g., fiber optic conductors, T-carrier, Synchronous Optical Network (SONET), and wireless techniques).

An access node 134 may serve one or more user devices 130 or other network destinations. Upstream data may be sent, for example, from a user device 130 to an access node 134. The data enters the network 104 along a communication medium (e.g., an LV power line 114) coupled to an access node 134. The data is routed through the network 104 to a backhaul node 132, (or a local destination, such as another user device 130). Downstream data is sent through the network 104 to a user device 130. Exemplary user devices 130 include a computer 130a, LAN, a WLAN, router 130b, Voice-over IP endpoint, game system, personal digital assistant (PDA), mobile telephone, digital cable box, power meter, gas meter, water meter, security system, alarm system (e.g., fire, smoke, carbon dioxide, security/burglar, etc.), stereo system, television, fax machine 130c, HomePlug residential network, or other device having a data interface. A user device 130 may include or be coupled to a modem to communicate with a given access node 134. Exemplary modems include a power line modem 136, a wireless modem 131, a cable modem, a DSL modem or other suitable transceiver device.

A repeater node 135 may receive and re-transmit data (i.e., repeat), for example, to extend the communications range of other communication elements. As a communication traverses the communication network 104, backhaul nodes 132 and access nodes 134 also may serve as repeater nodes 135 (e.g., for other access nodes and other backhaul nodes 132). Repeaters may also be stand-alone devices without additional functionality. Repeaters 135 may be coupled to and repeat data on MV power lines or LV power lines (and, for the latter, be coupled to the internal or external LV power lines).

Communication Protocols:

The communication network 104 may provide high speed internet access and other high data-rate data services to user devices, homes, buildings and other structure, and to each room, office, apartment, or other unit or sub-unit of multi-unit structure. In doing so, a communication link is formed between two communication nodes 128 over a communication medium. Some links are formed by using a portion 101 of the power system infrastructure. Specifically, some links are formed over MV power lines 110, and other links are formed over LV power lines 114. Still other links may be formed over another communication media, (e.g., a coaxial cable, a T-1 line, a fiber optic cable, wirelessly (e.g., IEEE 802.11 a/b/g, 802.16, 1 G, 2 G, 3 G, or satellite such as WildBlue®)). Some links may comprise wired Ethernet, multipoint microwave distribution system (MMDS) standards, DOCSIS (Data Over Cable System Interface Specification) signal standards or another suitable communication method. The wireless links may also use any suitable frequency band. In one example, frequency bands are used that are selected from among ranges of licensed frequency bands (e.g., 6 GHz, 11 GHz, 18 GHz, 23 GHz, 24 GHz, 28 GHz, or 38 GHz band) and unlicensed frequency bands (e.g., 900 MHz, 2.4 GHz, 5.8 GHz, 24 GHz, 38 GHz, or 60 GHz (i.e., 57-64 GHz)). I Accordingly, the communication network 104 includes links that may be formed by power lines, non-power line wired media, and wireless media. The links may occur at any point along a communication path between a backhaul node 132 and a user device 130, or between a backhaul node 132 and a distribution point 127 or aggregation point 124.

Communication among nodes 128 may occur using a variety of protocols and media. In one example, the nodes 128 may use time division multiplexing and implement one or more layers of the 7 layer open systems interconnection (OSI) model. For example, at the layer 3 'network' level, the devices and software may implement switching and routing technologies, and create logical paths, known as virtual circuits, for transmitting data from node to node. Similarly, error handling, congestion control and packet sequencing can be performed at Layer 3. In one example embodiment, Layer 2 'data link' activities include encoding and decoding data packets and handling errors of the 'physical' layer 1, along with flow control and frame synchronization. The configuration of the various communication nodes may vary. For example, the nodes coupled to power lines may include a modem that is substantially compatible with the HomePlug 1.0 or A/V standard. In various embodiments, the communications among nodes may be time division multiple access or frequency division multiple access.

Communication Devices:

Each communication node 128 may be formed by one or more communication devices. Communication nodes which communicates over a power line medium include a power line communication device. Exemplary power line communication devices include a backhaul point 138 (see FIGS. 2 and 3), an access device 139 (also referred to as a power line bridge) (see FIGS. 4 and 5), a repeater, and a power line modem 136 (see FIGS. 1 and 6). Communication nodes which access a link over a wireless medium may include a wireless access point having at least a wireless transceiver or a mobile telephone cell site (e.g., a micro or pico cell site). Communication nodes which access a link over a coaxial cable may include a cable modem. Communication nodes which access a link over a T-1 wire may include a DSL modem. According to an embodiment of a power line communication device, a backhaul point 138 or access device 139 or repeater may establish links over MV power lines 110, LV power lines 114, wired media, and wireless media. Accordingly, a given communication node may communicate along two or more directions establishing multiple communication links, which may be formed along the same or different types of communication media.

Backhaul Node 132:

Other communication nodes, such as access nodes, repeaters, and other backhaul nodes, may communicate to and from the IP network via a backhaul node 132. In one example embodiment, a backhaul node 132 comprises a backhaul device 138. The backhaul device 138, for example, may transmit communications directly to an aggregation point 124, or to an distribution point 127 which in turn transmits the data to an aggregation point 124.

Figure 2:
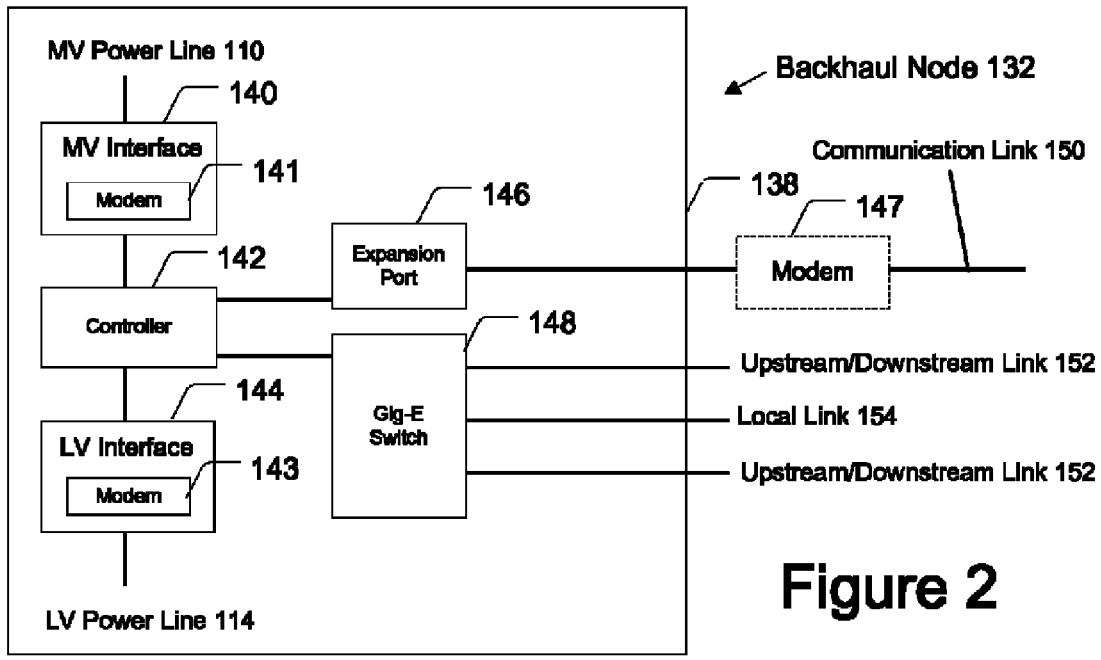
FIG. 2 is a block diagram of an example embodiment of a backhaul device.
Figure 3:
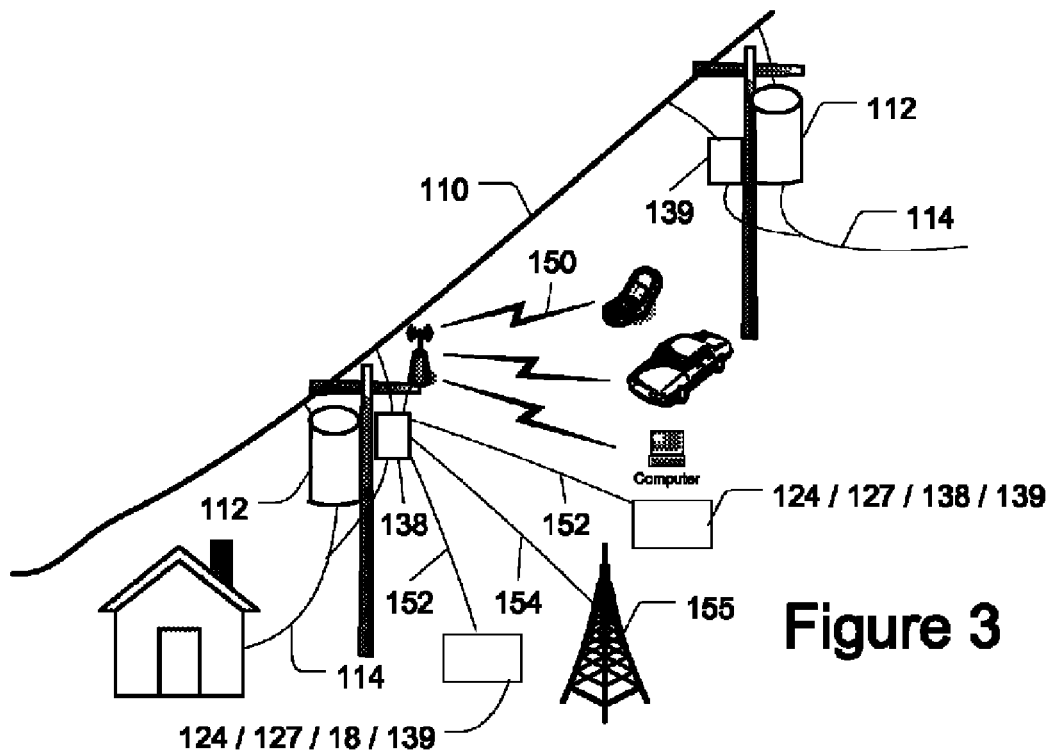
FIG. 3 illustrates an implementation of an example embodiment of a backhaul device capable of transmitting data over a variety of communications media.

FIGS. 2 and 3 show an example embodiment of a backhaul device 138 which may form all or part of a backhaul node 132. The backhaul device 138 may include a medium voltage power line interface (MV Interface) 140, a controller 142, an expansion port 146, and a gigabit Ethernet (gig-E) switch 148. In some embodiments the backhaul device 138 also may include a low voltage power line interface (LV interface) 144. The MV interface is used to communication over the MV power lines and may include an MV power line coupler coupled to an MV signal conditioner, which may be coupled to an MV modem 141. The MV power line coupler prevents the medium voltage power from passing from the MV power line 110 to the rest of the device's circuitry, while allowing the communications signal to pass between the backhaul device 138 and the MV power line 110. The MV signal conditioner may provide amplification, filtering, frequency translation, and transient voltage protection of data signals communicated over the MV power lines 110. Thus, the MV signal conditioner may be formed by a filter, amplifier, a mixer and local oscillator, and other circuits which provide transient voltage protection. The MV modem 141 may demodulate, decrypt, and decode data signals received from the MV signal conditioner and may encode, encrypt, and modulate data signals to be provided to the MV signal conditioner.

The backhaul device 138 also may include a low voltage power line interface (LV Interface) 144 for receiving and transmitting data over an LV power line 114. The LV interface 144 may include an LV power line coupler coupled to an LV signal conditioner, which may be coupled to an LV modem 143. In one embodiment the LV power line coupler may be an inductive coupler. In another embodiment the LV power line coupler may be a conductive coupler. The LV signal conditioner may provide amplification, filtering, frequency translation, and transient voltage protection of data signals communicated over the LV power lines 114. Data signals received by the LV signal conditioner may be provided to the LV modem 143. Thus, data signals from the LV modem 143 are transmitted over the LV power lines 110 through the signal conditioner and coupler. The LV signal conditioner may be formed by a filter, amplifier, a mixer and local oscillator, and other circuits which provide transient voltage protection. The LV modem 143 may demodulate, decrypt, and decode data signals received from the LV signal conditioner and may encode, encrypt, and modulate data signals to be provided to the LV signal conditioner.

The backhaul device 138 also may include an expansion port 146, which may be used to connect to a variety of devices. For example a wireless access point, which may include a wireless transceiver or modem 147, may be integral to or coupled to the backhaul device 138 via the expansion port 146. The wireless modem 147 may establish and maintain a communication link 150. In other embodiments a communication link is established and maintained over an alternative communications medium (e.g., fiber optic, cable, twisted pair) using an alternative transceiver device. In such other embodiments the expansion port 146 may provide an Ethernet connection allowing communications with various devices over optical fiber, coaxial cable or other wired medium. In such embodiment the modem 147 may be an Ethernet transceiver (fiber or copper) or other suitable modem may be employed (e.g., cable modem, DSL modem). In other embodiments, the expansion port may be coupled to a Wifi access point (IEEE 802.11 transceiver), WiMAX (IEEE 802.16), or mobile telephone cell site. The expansion port may be employed to establish a communication link 150 between the backhaul device 138 and devices at a residence, building, other structure, another fixed location, or between the backhaul device 138 and a mobile device. Alternately, various sensors also may be connected to the backhaul device 138 through the expansion port 146. Exemplary sensing devices that may be coupled to the backhaul device 138 through the expansion port 146 include a current sensor, power usage sensing device, a level sensor (to determine pole tilt), a camera (e.g., for monitoring security, detecting motion, monitoring children's areas, monitoring a pet area), an audio input device (e.g., microphone for monitoring children, detecting noises), a vibration sensor, a motion sensor (e.g., an infrared motion sensor for security), a home security system, a smoke detector, a heat detector, a carbon monoxide detector, a natural gas detector, a thermometer, a barometer, a biohazard detector, a water or moisture sensor, a temperature sensor, and a light sensor. The expansion port may provide direct access to the core processor (which may form part of the controller 142) through a MII (Media Independent Interface), parallel, serial, or other connection. This direct processor interface may then be used to provide processing services and control to devices connected via the expansion port thereby allowing for a more less expensive device (e.g., sensor).

The backhaul device 138 also may include a gigabit Ethernet (Gig-E) switch 148. Gigabit Ethernet is a term describing various technologies for implementing Ethernet networking at a nominal speed of one gigabit per second, as defined by the IEEE 802.3z and 802.3ab standards. There are a number of different physical layer standards for implementing gigabit Ethernet using optical fiber, twisted pair cable, or balanced copper cable. In 2002, the IEEE ratified a 10 Gigabit Ethernet standard which provides data rates at 10 gigabits per second. The 10 gigabit Ethernet standard encompasses seven different media types for LAN, MAN and WAN. Accordingly the gig-E switch may be rated at 1 gigabit per second (or greater as for a 10 gigabit Ethernet switch).

The switch 148 may be included in the same housing or co-located with the other components of the node (e.g., mounted at or near the same utility pole or transformer). The gig-E switch 148 maintains a table of which communication devices are connected to which switch 148 port (e.g., based on MAC address). When a communication device transmits a data packet, the switch receiving the packet determines the data packet's destination address and forwards the packet towards the destination device rather than to every device in a given network. This greatly increases the potential speed of the network because collisions are substantially reduced or eliminated, and multiple communications may occur simultaneously.

The gig-E switch 148 may include an upstream port for maintaining a communication link 152 with an upstream device (e.g., a backhaul node 132, an aggregation point 124, a distribution point 127), a downstream port for maintaining a communication link 152 with a downstream device (e.g., another backhaul node 134; an access node 134), and a local port for maintaining a communication link 154 to a Gig-E compatible device such as a mobile telephone cell cite 155 (i.e., base station), a wireless device (e.g., WiMAX (IEEE 802.16) transceiver), an access node 134, another backhaul node 132, or another device. In some embodiments the gig-E switch 148 may include additional ports.

In one embodiment, the link 154 may be connected to mobile telephone cell site configured to provide mobile telephone communications (digital or analog) and use the signal set and frequency bands suitable to communicate with mobile phones, PDAs, and other devices configured to communicate over a mobile telephone network. Mobile telephone cell sites, networks and mobile telephone communications of such mobile telephone cell sites, as used herein, are meant to include analog and digital cellular telephone cell sites, networks and communications, respectively, including, but not limited to AMPS, 1 G, 2 G, 3 G, GSM (Global System for Mobile communications), PCS (Personal Communication Services) (sometimes referred to as digital cellular networks), 1× Evolution-Data Optimized (EVDO), and other cellular telephone cell sites and networks. One or more of these networks and cell sites may use various access technologies such as frequency division multiple access (FDMA), time division multiple access (TDMA), or code division multiple access (CDMA) (e.g., some of which may be used by 2 G devices) and others may use CDMA2000 (based on 2 G Code Division Multiple Access), WCDMA (UMTS)—Wideband Code Division Multiple Access, or TD-SCDMA (e.g., some of which may be used by 3 G devices).

The gig-E switch 148 adds significant versatility to the backhaul device 138. For example, several backhaul devices may be coupled in a daisy chain topology (see FIG. 6), rather than by running a different fiber optic conductor to each backhaul node 134. Additionally, the local gig-E port allows a communication link 154 for connecting to high bandwidth devices (e.g., WiMAX (IEEE 802.16) or other wireless devices). The local gig-E port may maintain an Ethernet connection for communicating with various devices over optical fiber, coaxial cable or other wired medium. Exemplary devices may include user devices 130, a mobile telephone cell cite 155, and sensors (as described above with regard to the expansion port 146.

Communications may be input to the gig-E switch 148 from the MV interface 140, LV interface 144 or expansion port 146 through the controller 142. Communications also may be input from each of the upstream port, local port and downstream port. The gig-E switch 148 may be configured (by the controller 142 dynamically) to direct the input data from a given input port through the switch 148 to the upstream port, local port, or downstream port. An advantage of the gig-E switch 148 is that communications received at the upstream port or downstream port need not be provided (if so desired) to the controller 142. Specifically, communications received at the upstream port or downstream port may not be buffered or otherwise stored in the controller memory or processed by the controller. (Note, however, that communications received at the local port may be directed to the controller 142 for processing or for output over the MV interface 140, LV interface 144 or expansion port 146). The controller 142 controls the gig-E switch 148, allowing the switch 148 to pass data upstream and downstream (e.g. according to parameters (e.g., prioritization, rate limiting, etc.) provided by the controller). In particular, data may pass directly from the upstream port to the downstream port without the controller 142 receiving the data. Likewise, data may pass directly from the downstream port to the upstream port without the controller 142 receiving the data. Also, data may pass directly from the upstream port to the local port in a similar manner; or from the downstream port to the local port; or from the local port to the upstream port or downstream port. Moving such data through the controller 142 would significantly slow communications or require an ultra fast processor in the controller 142. Data from the controller 142 (originating from the controller 142 or received via the MV interface 140, the LV interface 144, or expansion port 146) may be supplied to the Gig-E switch 148 for communication upstream (or downstream) via the upstream port (or downstream port) according to the address of the data packet. Thus, data from the controller 142 may be multiplexed in (and routed/switched) along with other data communicated by the switch 148. As used herein, to route and routing is meant to include the functions performed by of any a router, switch, and bridge.

The backhaul device 138 also may include a controller 142 which controls the operation of the device 138. The backhaul 138 may also include a router, which routes data along an appropriate path. In this example embodiment, the controller 142 includes program code for performing routing (hereinafter to include switching and/or bridging). Thus, the controller 142 may maintain a table of which communication devices are connected to port in memory. The controller 142, of this embodiment, matches data packets with specific messages (e.g., control messages) and destinations, performs traffic control functions, performs usage tracking functions, authorizing functions, throughput control functions and similar related services. Communications entering the backhaul device 138 from the MV power lines 110 at the MV interface 140 are received, and then may be routed to the LV interface 144, expansion port 146 or gig-E switch 148. Communications entering the backhaul device 138 from the LV power lines 114 at the LV interface 144 are received, and may then be routed to the MV interface 140, the expansion port 146, or the gig-E switch 148. Communications entering the backhaul point 138 from the expansion port 146 are received, and may then be routed to the MV interface 140, the LV interface 144, or the gig-E switch 148. Accordingly, the controller 142 may receive data from the MV interface 140, LV interface 144 or the expansion port 146, and may route the received data to the MV interface 140, LV interface 144, the expansion port 146, or gig-E switch 148. In this example embodiment, user data may be routed based on the destination address of the packet (e.g., the IP destination address). Not all data packets, of course, are routed. Some packets received may not have a destination address for which the particular backhaul device 138 routes data packets. Additionally, some data packets may be addressed to the backhaul device 138 itself in which case the backhaul device may process the data as a control message.

Figure 4:
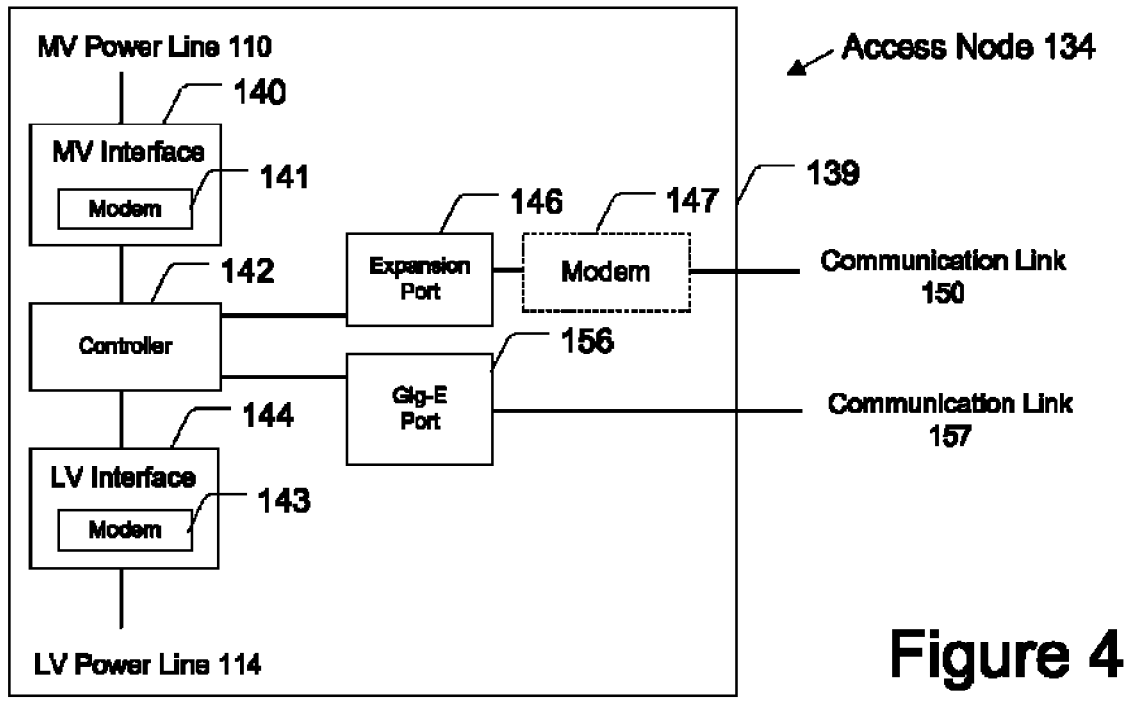
FIG. 4 is a block diagram of an example embodiment of an access device.
Figure 5:
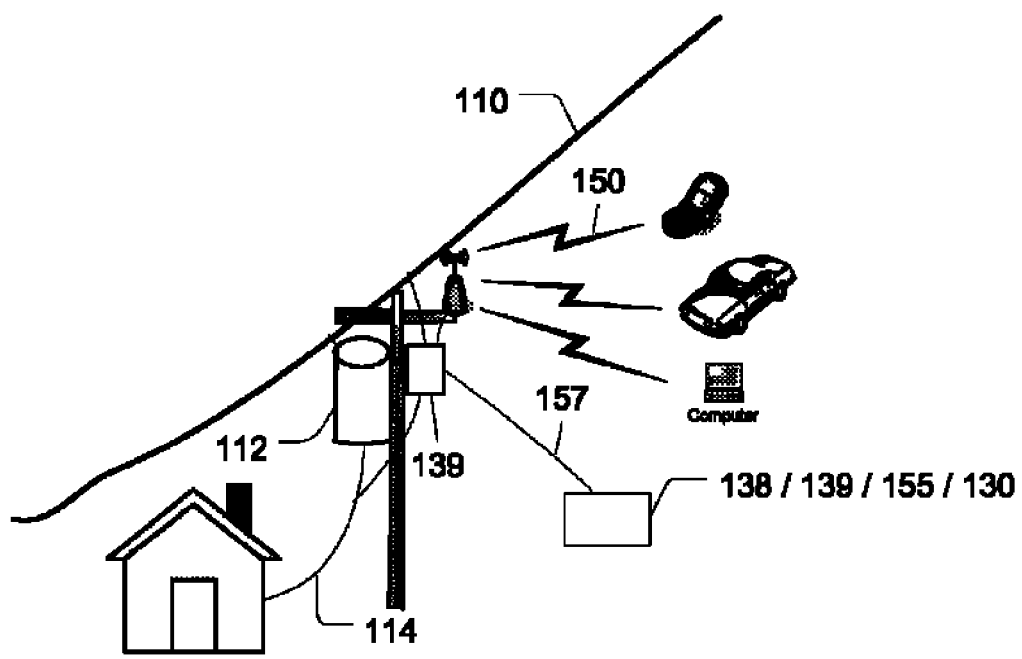
FIG. 5 illustrates an implementation of an example embodiment of an access device capable of transmitting data over a variety of communications media.

Access Node 134:

The backhaul nodes 132 may communicate with user devices via one or more access nodes 134, which may include an access device 139. FIGS. 4-5 show an example embodiment of such an access device 139 for providing communication services to mobile devices and to user devices at a residence, building, and other locations.

In one example embodiment, access communication nodes 124 provide communication services for user devices 130 such as security management; IP network protocol (IP) packet routing; data filtering; access control; service level monitoring; service level management; signal processing; and modulation/demodulation of signals transmitted over the communication medium.

The access device 139 of this node 134 may include a bypass device that moves data between an MV power line 110 and an LV power line 114. The access device 139 may include a medium voltage power line interface (MV Interface) 140 having a MV modem 141, a controller 142, a low voltage power line interface (LV interface) 144 having a LV modem 143, and an expansion port 146, which may have the functionality, functional components (and for connecting to such devices) as previously described above with regard to FIG. 2 of the backhaul device 138. The access device 139 also may include a gigabit Ethernet (gig-E) port 156. The gig-E port 156 maintains a connection using a gigabit Ethernet protocol as described above for the gig-E switch 146 of FIG. 2.

The Gig-E port 156 may maintain an Ethernet connection for communicating with various devices over optical fiber, coaxial cable or other wired medium. For example, a communication link 157 may be maintained between the access device 139 and another device through the gig-E port 156. For example, the gig-E port 156 may provide a connection to user devices 130, sensors (as described above with regard to the expansion port 146), or a cell station 155.

Communications may be received at the access device 139 through the MV interface 140, LV interface 144, expansion port 146 or gig-E port 156. Communications may enter the access device 139 from the MV power lines 110 through the MV interface 140, and then may be routed to the LV interface 142, expansion port 146 or gig-E port 156. Communications may enter the access device 139 from the LV power lines 114 through the LV interface 144, and then may be routed to the MV interface 140, the expansion port 146, or the gig-E port 156. Communications may enter the access device 139 from the expansion port 146, and then may routed to the MV interface 140, the LV interface 144, or the gig-E port 156. Communications may enter the access device 139 via the gig-E port 156, and then may be routed to the MV interface 140, the LV interface 144, or the expansion port 146. The controller 142 controls communications through the access device 139. Accordingly, the access device 139 receives data from the MV interface 140, LV interface 144, the expansion port 146, or the gig-E port 156 and may route the data to the MV interface 140, LV interface 144, expansion port 146, or gig-E port 156 under the direction of the controller 142. In one example embodiment, the access node 134 may be coupled to a backhaul node 132 via a wired medium coupled to Gig-E port 156 while in another embodiment, the access node is coupled to the backhaul node 132 via an MV power line (via MV interface 140). In yet another embodiment, the access node 134 may be coupled to a backhaul node 132 via a wireless link (via expansion port 146 or Gig-E port 156).

Software

The communication network 104 may be monitored and controlled via a power line server that may be remote from the structure and physical location of the network elements. The controller of the nodes 128 describe herein may include executable program code for controlling the operation of the nodes and responding to commands. The PLS may transmit any number of commands to a backhaul nodes 132 and access nodes 134 to manage the system. As will be evident to those skilled in the art, most of these commands are equally applicable for backhaul nodes 132 and access nodes 134. For ease of discussion, the description of the commands will be in the context of a node 128 (meant to include both). These commands may include altering configuration information, synchronizing the time of the node 128 with that of the PLS, controlling measurement intervals (e.g., voltage measurements), requesting measurement or data statistics, requesting the status of user device activations, rate shaping, and requesting reset or other system-level commands. Any or all of these commands may require a unique response from the node 128, which may be transmitted by the node 128 and received and stored by the PLS. The PLS may include software to transmit a command to any or all of the nodes (134 and 132) to schedule a voltage and/or current measurement at any particular time so that all of the network elements of the PLCS take the measurement(s) at the same time.

Alerts

In addition to commands and responses, the node 128 has the ability to send Alerts and Alarms to the PLS. Alerts typically are either warnings or informational messages transmitted to the PLS in light of events detected or measured by the node 128. Alarms typically are error conditions detected.

One example of an Alarm is an Out-of-Limit Alarm that indicates that an out-of-limit condition has been detected at the node 128, which may indicate a power outage on the LV power line, an MV or LV voltage too high, an MV or LV voltage too low, a temperature measurement inside the node 128 is too high, and/or other out-of-limit conditions. Information of the Out-of-Limit condition, such as the type of condition (e.g., a LV voltage measurement, a node 128 temperature), the Out-of-Limit threshold exceeded, the time of detection, the amount (e.g., over, under, etc.) the out of limit threshold has been exceeded, is stored in the memory of the node 128 and transmitted with the alert or transmitted in response to a request from the PLS.

Software Upgrade Handler

The Software Upgrade Handler software may be started by the node 128 Command Processing software in response to a PLS command. Information needed to download the upgrade file, including for example the remote file name and PLS IP address, may be included in the parameters passed to the Software Command Handler within the PLS command.

Upon startup, the Software Command Handler task may open a file transfer program such as Trivial File Transfer Protocol (TFTP) to provide a connection to the PLS and request the file. The requested file may then be downloaded to the node 128. For example, the PLS may transmit the upgrade through the Internet to the node 128 (and perhaps through the backhaul node, and over the MV power line) where the upgrade may be stored in a local RAM buffer and validated (e.g., error checked) while the node 128 continues to operate (i.e., continues to communicate packets). Finally, the task copies the downloaded software into a backup boot page in non-volatile memory, and transmits an Alert indicating successful installation to the PLS. The node 128 then makes the downloaded software the primary boot page and reboots. When the device restarts the downloaded software will be copied to RAM and executed. The device will then notify the PLS that it has rebooted via an alert indicating such. In addition, and through substantially the same procedure, new software code may be received by the controller for storage in (e.g., to replace existing code) and execution at the media access control (MAC) layer of the LV modem and/or the MV modem of the access device or the backhaul device.

ADC Scheduler

Any of the nodes described herein may include an analog to digital converter (ADC) for measuring the voltage and/or current of any power line. The ADC Scheduler software, in conjunction with the real-time operating system, creates ADC scheduler tasks to perform ADC sampling according to configurable periods for each sample type. Each sample type corresponds with an ADC channel. The ADC Scheduler software creates a scheduling table in memory with entries for each sampling channel according to default configurations or commands received from the PLS. The table contains timer intervals for the next sample for each ADC channel, which are monitored by the ADC scheduler.

ADC Measurement Software

The ADC Measurement Software, in conjunction with the real-time operating system, creates ADC measurement tasks that are responsible for monitoring and measuring data accessible through the ADC 330. Each separate measurable parameter may have an ADC measurement task. Each ADC measurement task may have configurable rates for processing, recording, and reporting for example.

An ADC measurement task may wait on a timer (set by the ADC scheduler). When the timer expires the task may retrieve all new ADC samples for that measurement type from the sample buffer, which may be one or more samples. The raw samples are converted into a measurement value. The measurement is given the timestamp of the last ADC sample used to make the measurement. The measurement may require further processing. If the measurement (or processed measurement) exceeds limit values, an alert condition may be generated. Out of limit Alerts may be transmitted to the PLS and repeated at the report rate until the measurement is back within limits. An out of limit recovery Alert may be generated (and transmitted to the PLS) when the out of limit condition is cleared (i.e., the measured value falls back within limit conditions).

The measurements performed by the ADC, each of which has a corresponding ADC measurement task, may include node 128 inside temperature, LV power line voltage, LV power line current (e.g., the voltage across a resistor), MV power line voltage, and/or MV power line current for example. MV power line measurements may be accomplished via a separate power line coupler, which may be an inductive coupler.

As discussed, the nodes may include value limits for most of these measurements stored in memory with which the measured value may be compared. If a measurement is below a lower limit or above an upper limit (or otherwise out of an acceptable range), the node 128 may transmit an Out-of-Limit Alert, which is received and stored by the PLS. In some instances, one or more measured values are processed to convert the measured value(s) to a standard or more conventional data value.

The LV power line voltage measurement may be used to provide various information. For example, the measurement may be used to determine a power outage (and subsequently a restoration), or measure the power used by a consumer or by all of the consumers connected to that distribution transformer. In addition, it may be used to determine the power quality of the LV power line by measuring and processing the measured values over time to provide frequency, harmonic content, and other power line quality characteristics.

Traffic Monitoring Software

The Traffic Monitoring software may collect various data packet traffic statistics, which may be stored in memory including the amount of data (i.e., packets and/or bytes) communicated (i.e., transmitted and received) through the MV power line, through the switch, and/or through the LV power line; the amount of data (packets and/or bytes) communicated (transmitted and received) to or from the PLS; the number of Alerts and Alarms sent to the PLS; the number of DHCP messages to or from user devices; the number of failed user device authentications; the number of failed PLS authentications; and the number of packets and bytes received and/or transmitted from/to each user device (or PLM 50).

Rate Limiting

The nodes may include software for monitoring the bit rate of a particular device (e.g., PLM, computer, television, stereo, telephone, fax, gaming device, etc.) and also for rate limiting the communications of the device. Thus, if the bit rate (i.e., number of bits communicated over a given time period) reaches a particular threshold value for the device (which may be stored in memory of the node 128), the node 128 may slow or stop (postpone) communications for that device (e.g., until the beginning of the next time period, which may be one or more seconds, milliseconds, minutes, or microseconds). The threshold value may be received from the PLS during initial configuration, after configuration, upon request by the user, or after a modification of the user's subscription level.

For example, a user may transmit a request to rate limit a particular device to the PLS, which would allow a parent to rate limit the communications of a child's gaming device (e.g., Xbox™, or Playstation™), the child's downloading of music or video, Voice of Internet Protocol (VoIP), peer to peer communications (e.g., often used to transfer MP3 music files), or the communication of video or image files. In response, the PLS may transmit a rate limiting command and information to the node 128 to activate rate limiting of the device or process, which thereby initiates rate limiting in response to the PLS command. Thus, rate limiting may be effected for only select devices or processes of the subscriber, which may be requested by the user. As an example, a parent could turn off, turn on, or limit VoIP at certain times of the day or days of the week.

The rate limit information transmitted to the node 128 may include information of the device (e.g., address) and/or process (e.g., which may be indicated by the type of packets communicated such as video, gaming, voice, computer, MP3) that are to be rate limited for that subscriber or device. Thus, the node 128 may include information in memory sufficient to recognize certain types of processes (or packets), which is compared to communicated data to determine if rate limiting should be performed. Similarly, if rate limiting is based on address information (e.g., of the source and/or destination device), the node 128 may include rate limiting address information in memory, which is compared to address information of the communicated data to determine whether rate limiting should be performed. The rate limit information may also include a first threshold value for upstream and a second threshold value for downstream communications, which may or may not be the same.

In one embodiment the home administrator may "setup" all the home users (and their limits) and the information may be stored in memory at the node 128. When a home user logs in, their rule base will be attached to the virtual interface created by the login to perform the rate limiting. In a second embodiment, the home administrator may "setup" all the home users (and their limits) and the information may be stored in memory on a server at the POP. When a home user logs in, their rule base will be attached to the virtual interface created by the login to perform the rate limiting. In a third embodiment, the home administrator may "setup" all the home users (and their limits) and the information may be stored in memory on a server at the POP. When a home user logs in, their rule base will be attached to the virtual interface created by the login. The server will transmit a command and data to dynamically add or remove filter and rate limit rules to the node 128, which will store the data in memory and filter and/or rate limit according to the received information. Rate limiting may implementing via Extensible Authentication Protocol (EAP), Point-to-Point Protocol Over Ethernet (PP-PoE), or virtual private network (VPN).

The rate limiting software in the node 128 (or remote POP server) may analyze the data packets and may limit the communication of data packets through the node 128 based on data packets: 1) that are transmitted to the user device from a particular source (e.g., from a particular person, PLM, modem, user, domain name, email address, IP address and/or MAC source address); 2) that are transmitted from the user device to a particular destination (e.g., to a particular person, email address, user, domain name, modem, IP address and/or MAC destination address); 3) that have particular content (e.g., voice data, gaming data, image, audio, and/or video data); 4) based on the time of transmission or reception (e.g., times of the day and/or day(s) of the week); 5) that surpass a threshold quantity of data (either transmitted, received, or combination thereof) for a predetermined window of time (e.g., hour, minute, second, day, week, month, year, or subscription period); and/or 6) some combination thereof.

The rate limiting function may be used to rate limit or completely stop any or all such transmissions described above according any of such conditions. As an example of an application of rate limiting, the user may limit a particular device (e.g., a VoIP telephone) or data (VoIP data) to zero bits per second (bps) (i.e., prevent telephone calls) from 3PM to 7PM on Monday through Friday. Alternately, the user may limit gaming data to 1 Mbps from between 7PM to 9PM and allow the default rate (e.g., the rate provided to the user via the user's subscription which may also be controlled by the rate limiting function) during other times.

The nodes may also implement quality of service (QoS) for packets to and from certain devices, as a means to rate limit or in addition to rate limiting. For example, data of live voice communications (e.g., telephone voice communications) may be given higher priority than video data, which may be given higher priority than, gaming data, and computer data. Software on the user device may also add tags (bits) to the data packets to allow the node 128 to recognize the type of packet for implementing QoS, rate limiting, and data filtering. Thus, the nodes may receive the QoS information via the power line or other medium from the PLS for a particular subscriber, device, or process, and store the information in memory. Subsequently, the PLS may change the QoS setting in response to a user request or a change in the user's subscription—as instructed by the PLS. For example, when the user transmits a request to upgrade his or her subscription from data to voice (telephone) and data, the PLS may transmit new QoS information to the node 128 so that voice data of the user is given higher priority for transmission.

Data Filtering Software

The Data Filtering software provides filtering of data packets transmitted to and/or from a user device (or PLM 50). The filtering criteria may be supplied from the PLS (which may be based on requests received from the user) and is stored in memory of the node 128 and may form part of the routing table. The Data Filtering software may analyze the data packets and may prevent the transmission of data packets through the node 128: 1) that are transmitted to the user device from a particular source (e.g., from a particular person, user, domain name, email address, or IP or MAC source address); 2) that are transmitted from the user device to a particular destination (e.g., to a particular person, email address, user, domain name, or IP or MAC destination address); 3) that have particular content (e.g., voice data or video data); 4) based on the time of transmission or reception (e.g., times of the day and/or days of the week); 5) that surpass a threshold quantity of data (either transmitted, received, or combination thereof) for a predetermined window of time (e.g., a day, week, month, year, or subscription period); or 7) some combination thereof.

Examples of access devices 139, backhaul points 138, repeaters 158, power line servers, and other components are provided in U.S. patent application Ser. No. 11/091,677 filed Mar. 28, 2005, (Publ. No. 20050168326), entitled "Power Line Repeater System and Method," which is hereby incorporated by reference in its entirety. A detailed description of another example PLCS, its components and features is provided in U.S. patent application Ser. No. 10/973,493 filed Oct. 26, 2004, entitled "Power Line Communications System and Method of Operating the Same," which is hereby incorporated by reference in its entirety.

Figure 6:
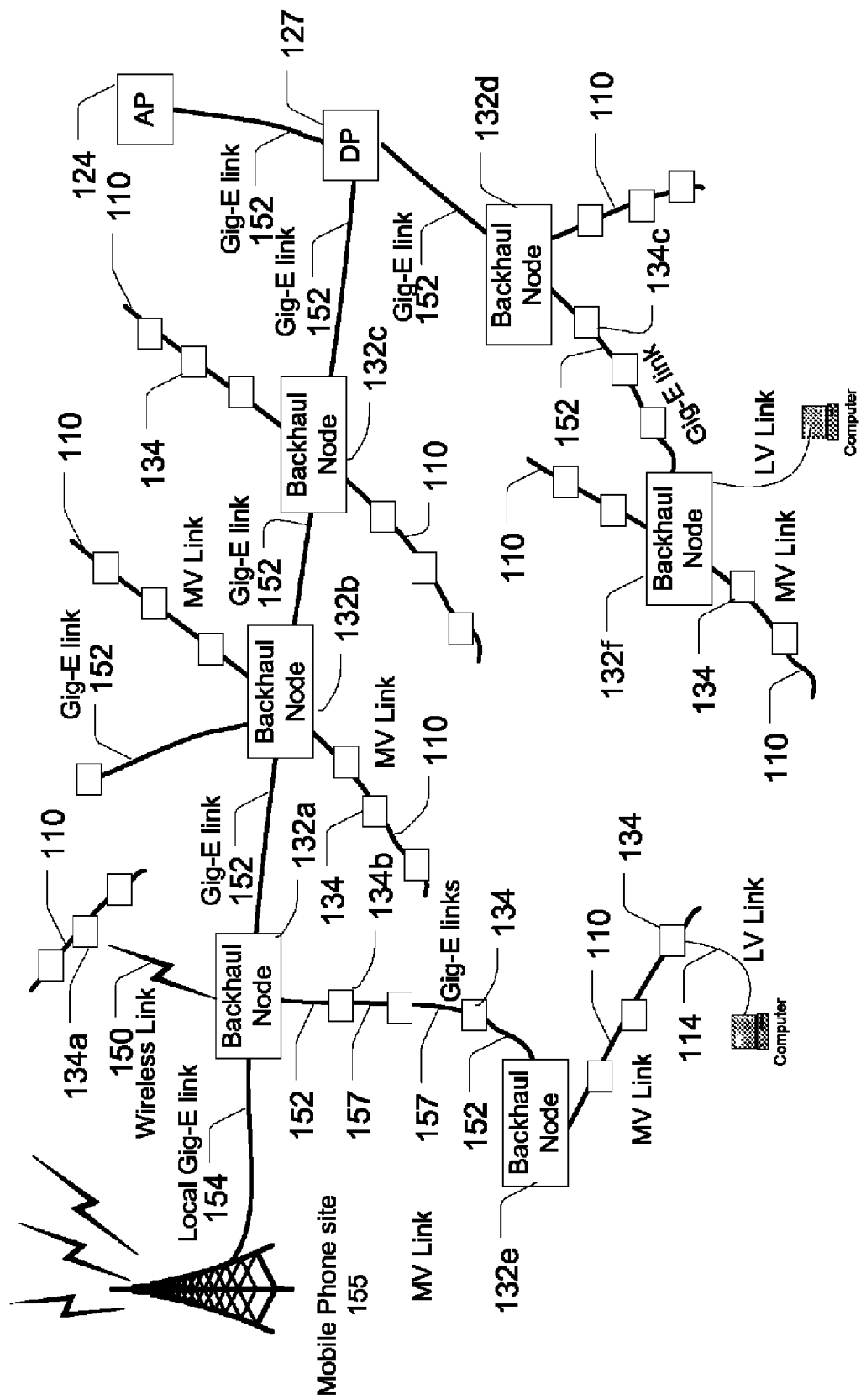
FIG. 6 is a partial network diagram showing an example topology of a communication system according to an example embodiment of the present invention.

FIG. 6 shows an example embodiment of a network topology which illustrates many of the communication features of the backhaul node 132 and access node 134. For example, several backhaul nodes 132a-c may be coupled together in a daisy chain configuration by communication links 152. Such links 152 may be formed by the upstream and downstream ports of the gig-E switch 148 of the respective backhaul nodes 132. The gig-E switch 148 also may be implemented to connect a backhaul node 132c to a distribution point 127. Accordingly, the gig-E switch 148 may form part of a communication link along a path for communicating with an internet protocol network 126. Further, a local port of a gig-E switch 148 may be implemented to couple a backhaul node 132a to a mobile phone site 155 via link 154. The backhaul nodes 132a-d also may be coupled to MV power lines 110 to maintain MV links for communication with multiple access nodes 134 (shown as small rectangles). The backhaul node 132a may also be coupled to an access node 134a (which may repeat data for other access nodes 134) over a wireless communication link 150, for example, through the expansion port 146. The backhaul node 132a is further illustrated to couple to a chain of access devices 134 and a backhaul node 132e. The link from the backhaul node 132a to the access node 134b may be formed by coupling a downstream port of the gig-e switch 148 of backhaul node 132a to the gig-E port 156 of the access node 134b. A similar link is shown between the backhaul node 132d and the access node 134c. Still another communication link is shown over an LV power line 114 to couple an access node 134d to a computer and to couple a backhaul node 132f to computer via a LV power line 114.

Other Devices:

Another communication device is a repeater (e.g., indoor, outdoor, low voltage (LVR) and/or medium voltage) which may form part of a repeater node 135. A repeater serves to extend the communication range of other communication elements (e.g., access devices, backhaul points, and other nodes). The repeater may be coupled to power lines (e.g., MV power line; LV power line) and other communication media (e.g., fiber optical cable, coaxial cable, T-1 line or wireless medium). Note that in some embodiments, a repeater node 135 may also include a device for providing a link to a user device 130 (and thus also serve as an access node 134).

In various embodiments a user device 130 is coupled to an access node 134 using a modem. For a power line medium, a power line modem 136 is used. For a wireless medium, a wireless modem is used. For a coaxial cable, a cable modem is may be used. For a twisted pair, a DSL modem may be used. The specific type of modem depends on the type of medium linking the access node 134 and user device 130.

A power line modem 136 couples a communication onto or off of an LV power line 114. A power line modem 136 is coupled on one side to the LV power line. On the other side, the power line modem 136 includes a connector to connect to a wired or wireless medium leading to the user device 130. One protocol for communicating with access nodes 132 over an LV power line is the HomePlug 1.0 standard of the HomePlug® Alliance for routing communications over low voltage power lines. In this manner, a customer can connect a variety of user devices 130 to the communication network 104.

It is to be understood that the foregoing illustrative embodiments have been provided merely for the purpose of explanation and are in no way to be construed as limiting of the invention. Words used herein are words of description and illustration, rather than words of limitation. In addition, the advantages and objectives described herein may not be realized by each and every embodiment practicing the present invention. Further, although the invention has been described herein with reference to particular structure, materials and/or embodiments, the invention is not intended to be limited to the particulars disclosed herein. Rather, the invention extends to all functionally equivalent structures, methods and uses, such as are within the scope of the appended claims. Those skilled in the art, having the benefit of the teachings of this specification, may affect numerous modifications thereto and changes may be made without departing from the scope and spirit of the invention.

What is claimed is:

1. A power line communication device, comprising:
a controller having memory;
a switch communicatively coupled to said controller and having an upstream port and a downstream port;
a first modem in communication with said controller via a data path that does not include said switch;
a first power line interface including a second modem, wherein said second modem is in communication with said controller via a data path that does not include said switch and wherein said power line interface is configured to be coupled to a medium voltage power line;
wherein said switch includes an internal port coupled to said controller;
wherein said upstream port is configured to communicate with an external device via a data path that does not include a modem to provide upstream communications; and
wherein said switch is configured to control the flow of data between said upstream port, said internal port, and said downstream port.

2. The power line communication device of claim 1, wherein in a first configuration said switch is configured to communicate data from said upstream port to said downstream port and from said downstream port to said upstream port without the data being supplied to the controller.

3. The power line communication device of claim 1, wherein said switch further comprises a third port configured to communicate with an external device via a data path that does not include a modem.

4. The power line communication device of claim 1, wherein said switch comprises a gigabit Ethernet switch configured to communicate data at a rate of one gigabit per second or greater.

5. The power line communication device of claim 1, wherein said controller is configured to route data.

6. The power line communication device of claim 1, wherein the controller is configured to provide control information to said switch.

7. The power line communication device of claim 1, wherein said first modem comprises a wireless transceiver for communicating wirelessly.

8. The power line communication device of claim 1, wherein said first modem forms part of second power line interface configured to communicate over a power line.

9. The power line communication device of claim 1, further comprising a second power line interface having a third modem coupled to said controller.

10. The power line communication device of claim 1, further comprising a third port coupled to said controller.

11. The power line communication device of claim 1, wherein said switch includes a third port configured to be coupled to a mobile telephone cell site.

12. The power line communication device of claim 1, wherein said switch is communicatively coupled to a switch of another power line communication device via a data path that does not include a modem.

13. The power line communication device of claim 1, wherein said power line interface is configured to be coupled to a low voltage (LV) power line for communicating with a plurality a user devices.

14. The power line communication device of claim 1, wherein said power line interface is configured to be coupled to a medium voltage power line.

15. The power line communication device of claim 1, wherein said switch is configured to be coupled to an access node.

16. The power line communication device of claim 1, wherein said first power line interface is configured to communicate with a plurality of power line access nodes via the power line.

17. A power line communication device, comprising:
a controller having memory;
a first power line interface configured to be coupled to a medium voltage power line and having a first modem in communication with said controller;
a switch comprising:
an upstream port configured to communicate with an external device via a data path that does not include a modem to provide upstream communications;
a data port configured to communicate at a data rate of at least one gigabit per second;
a data path between said upstream port and said data port;
a downstream port; and
an internal port coupled to said controller;
wherein said switch is configured to control the flow of data between said upstream port, said data port, said internal port, and said downstream port; and
wherein said first modem is in communication with said controller via a communication path that does not include said switch.

18. The device of claim 17,
further comprising a wireless transceiver in communication with said data port of said switch.

19. The power line communication device of claim 18, wherein said switch comprises a gigabit Ethernet switch configured to communicate data at a rate of one gigabit per second or greater.

20. The power line communication device of claim 18, wherein said switch is coupled to a switch of another line communication device via a data path that does not include a modem.

21. The power line communication device of claim 17, further comprising a communications port in communication with said controller and configured to provide a communication link via a non-power line medium.

22. The power line communication device of claim 21, wherein the non-power line communication medium comprises one of a wireless medium, a fiber optic medium, and a coaxial cable medium.

23. The power line communication device of claim 17, wherein the data port is configured to be coupled to a mobile telephone cell site.

24. A power line communication device, comprising:
a controller having a memory;
a first power line interface including a first modem, wherein said first modem is in communication with said controller and wherein said power line interface is configured to be coupled to a medium voltage power line;
a switch having an internal port coupled to said controller, an upstream port, and a downstream port;
wherein said upstream port is configured to communicate with an external device via a path that does not include a modem;
wherein said downstream port is configured to communicate with an external device via a path that does not include a modem;
wherein said switch is configured to control the flow of data between said upstream port, said internal port, and said downstream port; and
wherein said first modem is in communication with said controller via a communication path that does not include said switch.

25. The power line communication device of claim 24, wherein in a first configuration said switch is configured to communicate data from said downstream port to said upstream port without the data being supplied to the controller.

26. The power line communication device of claim 25, wherein in said first configuration said switch is configured to communicate data from said upstream port to said downstream port without the data being supplied to the controller.

27. The power line communication device of claim 24, wherein said switch further comprises a third port configured to communicate with an external device via a data path that does not include a modem.

28. The power line communication device of claim 24, wherein said controller and said switch are each configured to route data.

29. The power line communication device of claim 24, wherein said controller is configured to provide control information to said switch.

30. The power line communication device of claim 24, further comprising a wireless transceiver coupled to said controller.

31. The power line communication device of claim 24, further comprising a second power line interface having a second modem coupled to said controller via a data path that does not include said switch.

32. The power line communication device of claim 24, further comprising a third port coupled to said controller and wherein said third port is configured to be coupled to a sensor.

33. The power line communication device of claim 24, wherein said switch includes a third port configured to be coupled to a mobile telephone cell site.

34. The power line communication device of claim 24, wherein said switch is coupled to a switch of another power line communication device via a data path that does not include a modem.

35. The power line communication device of claim 24, wherein the power line interface is configured to be coupled to a medium voltage power line.

36. The power line communication device of claim 24, wherein the switch is configured to be coupled to an access node.

37. The power line communication device of claim 24, wherein said first power line interface is configured to communicate with a plurality of power line access nodes via the power line.

* * * * *